US008682039B2

(12) United States Patent
DeGutis

(10) Patent No.: US 8,682,039 B2
(45) Date of Patent: Mar. 25, 2014

(54) METHOD AND APPARATUS FOR ENHANCING FACE RECOGNITION ABILITIES IN A USER

(76) Inventor: Joseph Michael DeGutis, Brookline, MA (US)

(*) Notice: Subject to any disclaimer, the term of this patent is extended or adjusted under 35 U.S.C. 154(b) by 825 days.

(21) Appl. No.: 12/354,393

(22) Filed: Jan. 15, 2009

(65) Prior Publication Data

US 2009/0180673 A1    Jul. 16, 2009

Related U.S. Application Data

(60) Provisional application No. 61/021,462, filed on Jan. 16, 2008.

(51) Int. Cl.
 *G06K 9/00* (2006.01)
(52) U.S. Cl.
 USPC .......................... 382/118; 382/115; 382/159
(58) Field of Classification Search
 USPC .......................... 382/118, 159, 278, 284, 115
 See application file for complete search history.

(56) References Cited

U.S. PATENT DOCUMENTS

| 2007/0166675 A1 | 7/2007 | Atkins et al. |
| 2007/0218441 A1 | 9/2007 | Delahunt et al. |

OTHER PUBLICATIONS

DeGutis et al: "Functional plasticity in ventral temporal cortex following cognitive rehabilitation of a congenital prosopagnosis", J. of Cognitive neuroscience, 19:11, MIT, pp. 1790-1802, Posted on line on Oct. 24, 2007.*
Bentin et al: "Too many trees to see the forest: performance, event-related potential, and functional magnetic resonance imaging manifestations of integrative congenital prosopagnosia", J. of Cognitive neuroscience, 19:1, MIT, pp. 132-146, Posted on line on Jan. 10, 2007.*
Golby et al: "Differential responses in the fusiform region to same-race and other-race faces", Nature Neuroscience, vol. 4, No. 8, 2001.*
Bukach et al., "Perceptual Expertise Effects Are Not All or None: Spatially Limited Perceptual Expertise for Faces in a Case of Prosopagnosia", *Journal of Cognitive Neuroscience* 18(1), pp. 48-63 (2006).
Francis et al., "'Who's that girl?' Prosopagnosia, person-based semantic disorder, and the reacquisition of face identification ability", *Neuropsychological Rehabilitation* 12(1), pp. 1-26 (2002).
Lebrecht et al., "Perceptual Other-Race Training Reduces Implicit Racial Bias", *PLoS One* 4(1), pp. 1-7 (2009).

(Continued)

*Primary Examiner* — Ruiping Li
(74) *Attorney, Agent, or Firm* — K&L Gates LLP

(57) ABSTRACT

A method for enhancing face recognition abilities in a user. The method in one embodiment includes the steps of generating a first plurality of faces, each face differing from other faces in at least one aspect; displaying each of the faces to the user; and perceptually discriminating by the user, each of the displayed faces in response to the at least one aspect. In another aspect the invention relates to an apparatus for enhancing face recognition abilities in a user. In one embodiment the apparatus includes a system for generating a first plurality of faces, each face differing from other faces in at least one aspect; a display for displaying each of the faces to the user; and a device for recording the perceptually discriminating, by the user, each of the displayed faces in response to the at least one aspect.

25 Claims, 2 Drawing Sheets

(56) References Cited

OTHER PUBLICATIONS

Powell et al., "Enhancement of face recognition learning in patients with brain injury using three cognitive training procedures", *Neuropsychological Rehabilitation* 22(1), pp. 1-22 (2006).

Schmalzl et al., "Training of familiar face recognition and visual scan paths for faces in a child with congenital prosopagnosia", *Cognitive Neuropshychology* 25(5), pp. 704-729 (2008).

Tanaka et al., "The neural plasticity of other-race face recognition", *Cognitive, Affective, and Behavioral Neuroscience in Press* pp. 1-38 (2008).

Gauthier et al., "Unraveling Mechanisms for Expert Object Recognition: Bridging Brain Activity and Behavior," Journal of Experimental Psychology: Human Perception and Performance, 28(2):431-446, 2002.

Behrmann et al., "Behavioral change and its neural correlates in visual agnosia after expertise training," Journal of Cognitive Neuroscience, 17(4):554-568, 2005.

Gauthier et al., "Training 'Greeble' Experts: A Framework for Studying Expert Object Recognition Processes," Nov. 25, 1997, pp. 1-22.

\* cited by examiner

METHOD AND APPARATUS FOR ENHANCING FACE RECOGNITION ABILITIES IN A USER

RELATED APPLICATIONS

This application claims priority to provisional application Ser. No. 61/021,462 filed Jan. 16, 2008, which is herein incorporated in its entirety by reference.

FIELD OF THE INVENTION

The invention relates in general to computer aided modification of user capability and more specifically to the enhancement of the ability of a user to visually process and remember faces.

BACKGROUND OF THE INVENTION

Prosopagnosia is a visual disorder in which patients have marked difficulties in perceiving and remembering faces. Prosopagnosia can be caused by an acute brain injury such as stroke (quite rare), degenerative processes such as aging or dementia (more common, but still somewhat rare), or from hereditary and developmental factors (quite common, ~1 in 100 in the general population). At the perceptual level, prosopagnosics are overwhelmed with visual details and have particular difficulties at visually integrating parts into a coherent whole. Specifically, it has been shown that prosopagnosics have deficits on tasks that require discriminating multiple spatial relationships at once. These deficits particularly affect face perception and identification, which involves rapidly computing spatial relations among inner face components and integrating this information into a holistic percept. In addition to general face recognition deficits in prosopagnosia, normal face perceivers show difficulties perceiving and remembering faces from races that they have little experience with compared to faces from races they have extensive experience with. This is called the 'other race effect' and is partly due to a more piecemeal processing style of facial features with other race faces and a more integrative and holistic processing style applied to familiar race faces. In addition to deficits in processing other race faces in normal subjects and prosopagnosia, there are also individuals with superior face perception and face memory abilities. These individuals are able to rapidly integrate the spatial configuration of facial features. Thus, training this integration process in prosopagnosics and normal perceivers may enhance deficient face processing abilities, abolish deficits in processing other race faces, and may improve normal face perception and memory into the superior range.

The present invention provides a method and apparatus for not only treating prosopagnosics but also training normal individuals to recognize faces more effectively. Such training has particular application in the security and law enforcement fields.

SUMMARY OF THE INVENTION

In one aspect, the invention relates to a method for enhancing face recognition abilities in a user. The method in one embodiment includes the steps of generating a first plurality of faces, each face of the first plurality of faces differing from other faces in the first plurality of faces in at least one aspect; displaying each of the faces of the first plurality of faces sequentially (or non-sequentially) to the user; and perceptually discriminating, by the user, each of the displayed faces in response to the at least one aspect.

In one embodiment, the aspect by which each of the faces differs from the other faces in the first plurality of faces is the distance between the mouth and the nose of the face. In another embodiment, the aspect by which each of the faces differs from the other faces in the first plurality of faces is the distance between the eyes and the eyebrows of the face. In yet another embodiment, the method further includes the step of repeating the steps of displaying and categorizing for a predetermined number of days. In still yet another embodiment, the method further includes the step of measuring the performance of the user in categorizing the displayed faces. In one embodiment, the step of perceptually discriminating comprises responding as to whether faces are the same or different.

In another embodiment, the method further includes the steps of: generating a second plurality of faces, each face of the second plurality of faces differing less from other faces in the second plurality of faces in the at least one aspect than each face of the first plurality of faces differed from other faces in the first plurality of faces in the at least one aspect; displaying each of the faces of the second plurality of faces to the user; and the user perceptually discriminating each of the displayed faces of the second plurality of faces in response to the at least one aspect. In still another embodiment, the method further includes the step of measuring the performance of the user in categorizing the displayed faces of the second plurality of faces. In still yet another embodiment, the method further includes periodically performing the steps of displaying and categorizing in response to user needs. In still yet another embodiment, the steps of displaying and categorizing are performed remotely.

In another aspect, the invention relates to an apparatus for enhancing face recognition abilities in a user. In one embodiment, the apparatus includes a system for generating a first plurality of faces, each face of the first plurality of faces differing from other faces in the first plurality of faces in at least one aspect; a display for displaying each of the faces of the first plurality of faces to the user; and a device for recording the perceptual discrimination, by the user, to each of the displayed faces in response to the at least one aspect. In one embodiment, one or more of the faces include family members or friends of the user. In one embodiment, the faces are computer generated lifelike (or substantially lifelike) and in another they are actual or modified actual photographs.

In another embodiment, the system further includes a system for measuring the performance of the user in categorizing the displayed faces. In another embodiment, the system further includes a network connection to permit the user to use the display and recording portions of the system remotely. In one embodiment, the step of perceptually discriminating comprises responding as to whether two sequentially presented faces are the same or different from each other.

In another aspect, the invention relates to a method for treating prosopagnosia in a patient. In one embodiment, the method includes the steps of: generating a first plurality of lifelike faces, each face of the first plurality of lifelike faces differing from other faces in the first plurality of lifelike faces in at least one aspect; displaying each of the faces of the first plurality of lifelike faces to the patient having prosopagnosia; and perceptually discriminating, by the patient, each of the displayed faces in response to the at least one aspect.

In various embodiments and aspects the term "perceptually discriminating" is used. However, the scope of the terms discussed herein is not intended to be limiting, but rather to clarify their usage and incorporate the broadest meaning of the terms as known to those of ordinary skill in the art. Accordingly, in one embodiment perceptually discriminating means categorizing, characterizing, making a judgment with respect to two faces, responding to a user query, selecting between one or more displayed objects, viewing one or more displayed objects, and detecting the difference between a displayed object and another object (whether or not displayed).

In various embodiments, one face differs from one or more other faces in at least one aspect. In this context of differences between faces, this at least one differential aspect (generally an aspect), can include but is not limited to configurable facial portions or elements, face size, facial element position, distances between facial elements, and other detectable facial characteristics or parameters of interest. In one embodiment, the objects include faces or elements thereof. In addition, as used herein the term "face" can mean a two dimensional image of a face, a three-dimensional image of a face, a simulation of a face, or any other representation of a portion of a face suitable for display on an electronic display.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

DESCRIPTION OF THE EMBODIMENTS OF THE INVENTION

In brief overview the process for enhancing face recognition in a user includes the creation of multiple facial images, each differing from the other by an aspect, such as the placement of the mouth relative to the nose or the placement of the eyebrows relative to the eyes. In general, two facial elements (such as but not limited to, the eyes, nose, mouth, lips, and brows) are moved such that relative distance between them increases or decreases. A user is then shown the faces and asked to categorize the faces into one or more groups. The correctness of the categorization is then measured. These approaches offer various benefits. These benefits can include improving face perception and identification skills of a user, improving face perception and identification skills relative to faces of different races, treating perceptual issues relating to facial recognition, teaching and educating people, calibrating facial recognition treatment systems and various other medical, educational, and entertainment uses.

Figure 1:
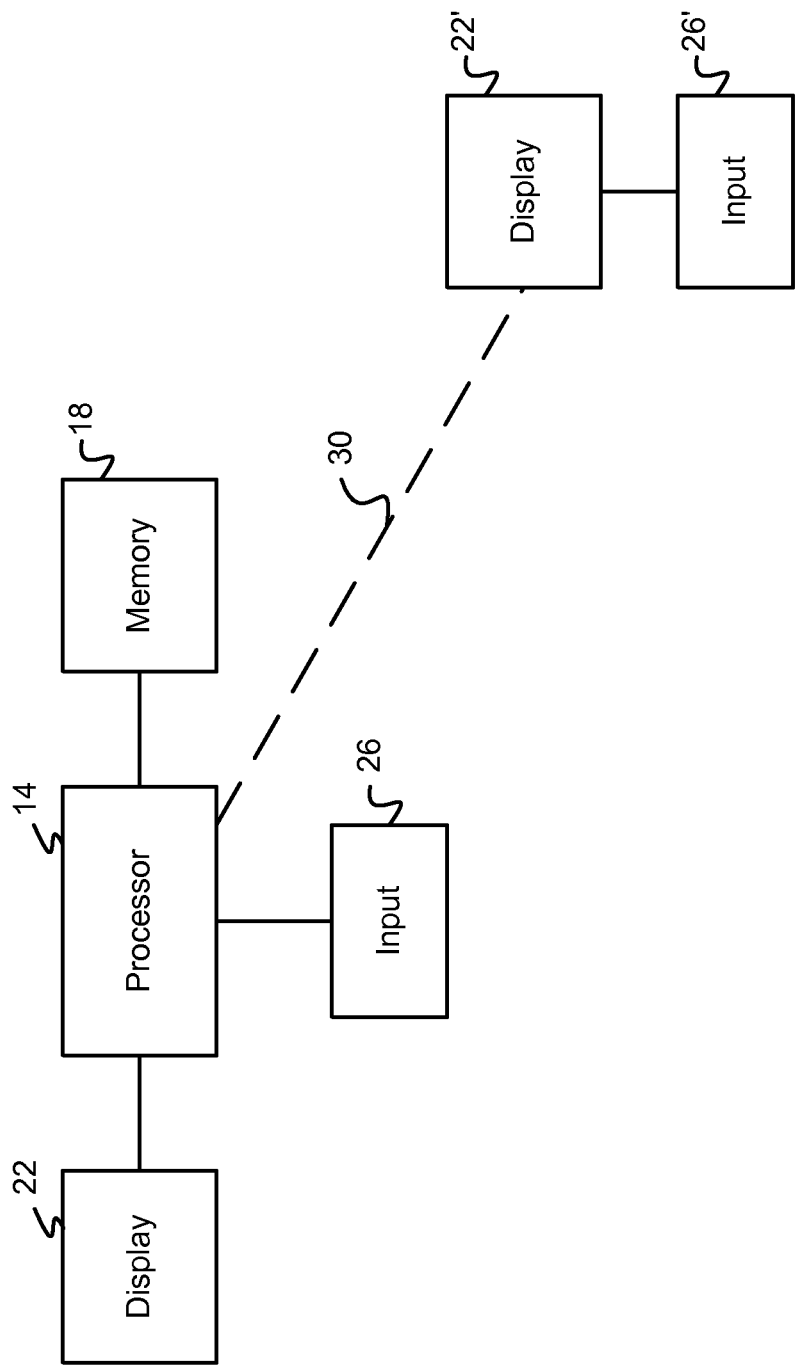
FIG. 1 is a schematic diagram of an embodiment of the system.

In general, and referring to FIG. 1, an embodiment of the system of the invention 10 includes a processor 14 having a memory 18, a display 22 and an input device 26. In one embodiment the display 22' and input device 26' are connected to the processor 14 by way of a network connection 30. The set of facial images is stored in memory 18 and displayed on display 22. This embodiment can be implemented over a network such that one or more system 10 components are connected via a data link such that linked components can be in different physical locations.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

The methods and systems described herein can be performed in software on general purpose computers, laptops, servers, or other processors, with appropriate magnetic, optical or other storage that is part of the computer or server or connected thereto, such as with a bus. The processes can also be carried out in whole or in part in a combination of hardware and software, such as with application specific integrated circuits. The software can be stored in one or more computers, servers, or other appropriate devices, and can also be kept on a removable storage media, such as a magnetic or optical disks. Furthermore, the methods and algorithms described herein can be implemented using as an SDK, an API, as middleware, and combinations thereof.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

In more detail, the training task is administered over a period of time in multiple separate intervals. The training consists of performing a face classification task in which the user classifies faces into multiple categories. In one embodiment the distance between the eyes and the eyebrows and the distance between the mouth and the nose varied for each of the faces.

Figure 2:
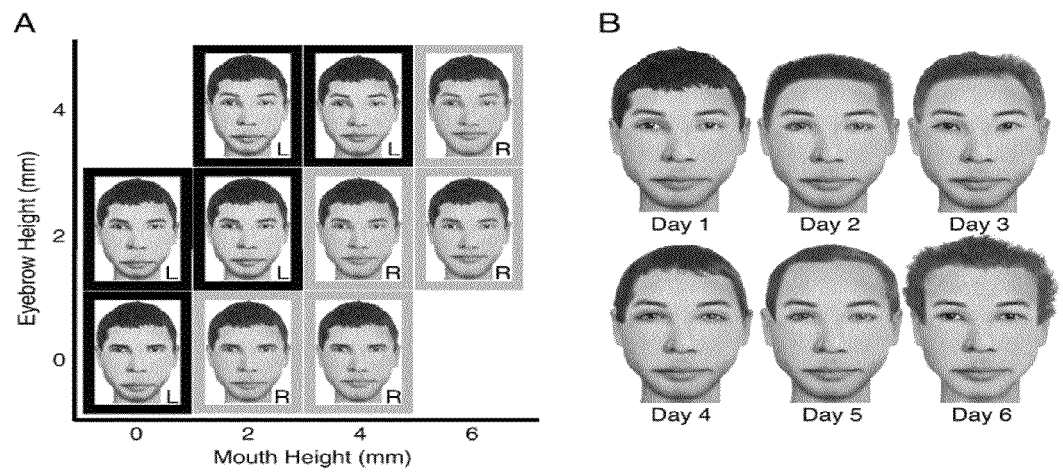
FIG. 2 is an embodiment of a set of faces used in the invention.

In one embodiment, for the training, lifelike faces are created from the faces-composite-face-making software such as Faces V 3.0, (IQ Biometrix, Inc., Kingwood, Tex.). In one embodiment, FIG. 2, one face is used as a template and eyebrow height and mouth height are parametrically varied in 2-mm increments to make 10 faces.

At the beginning of training, the user is shown the matrix of faces and told a categorization rule. In one embodiment the rule is: "faces with higher eyebrows and lower mouths are generally in Category 1 and faces with lower eyebrows and higher mouths are generally in Category 2." Next, the user receives a number of trials of self paced computer training in which the user is shown a face and has to respond with an indication designating Category 1 or Category 2. In one embodiment the user presses a button to indicate the category.

Feedback (correct/incorrect) is provided immediately after each trial. After a number of trials, the user is provided a feedback matrix that shows the accuracy and reaction time for each face. In one embodiment a 250-trial session is performed on the first training day and three are performed on each training day thereafter. To ensure that the user actually determines the relational information rather than learning the individual 10 faces, new faces are used each day.

At the end of the first training interval the user is given a more difficult version of the task in which the relational changes are reduced in size (1-mm increments between feature values compared to 2-mm increments in the previous set). In one embodiment the user is given this second training set to use at home over a period of months. In other embodiments, the user is shown actual photographs of individuals, some of which may have been modified to vary the spacing of various facial components.

In one test a 48-year-old prosopagnosic with severe difficulty in face identification abilities was treated with the method. The patient (or user) did not complain about problems in identifying animals or nonliving objects, and had normal visual acuity as measured by Snellen chart, normal contrast sensitivity as measured by the Vis Tech chart, and normal color vision as measured by Ishihara plates. There was no evidence of diplopia or strabismus and no history of head trauma or cognitive deficits. Performance on these tests demonstrated that face recognition impairments were not a consequence of low-level visual dysfunction.

In an informal test, the patient identified 5 out of 20 famous faces compared with an average identification of 16/20 in a normative group. Formal tests prior to training revealed that the patient was severely impaired in tests of visual memory for faces but not for words (Warrington Recognition Memory Test [WRMT]: 37/50 and 49/75 for faces and words, respectively). In addition, the patient was severely impaired at unfamiliar face matching (Benton Facial Recognition Test [BFRT]: 34/54). This pattern suggests that the patient was particularly severe example of prosopagnosia, with an aperceptive factor.

Figure 3:
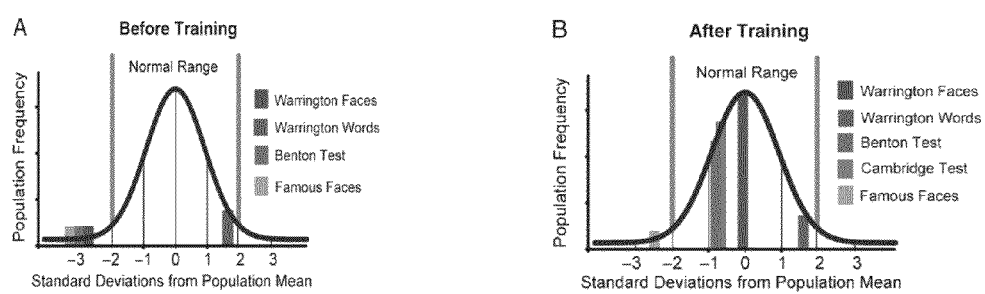
FIG. 3 is a graph of a user's performance in neuropsychological tests before and after training.

Referring to FIG. 3, during the initial 250 training trials, the patient was severely deficient at the face classification task, taking nearly 13 sec to make each judgment. During the second training day, the patient made significant improvement in the response speed (from 13 sec to approximately 3 sec per judgment) without a reduction in accuracy. At the end of the week (4000 trials) the patient attained similar accuracy as 10 control participants with normal face recognition abilities.

Although the patient's reaction times (RT) were still significantly slower than the control group (control group RT mean=980 msec, Std. Dev=43 msec., patient RT mean=1350 msec, z-score=−8.6), they were 10 times faster than when the training started. The z-score indicates that the patient was 8.6 standard deviations below the mean of the control group. After a period without training, the second interval of training demonstrated savings in relearning. On the first day of retraining the patient was considerably faster than the first training interval. On the second day the patient's mean RTs were under 2 sec, a level that was not reached until the $4^{th}$ day of the initial training session. Furthermore, on the 6th of the second training interval, the patient's mean RT reached 893 msec, similar to participants with normal face recognition abilities.

Although there was no visible improvement in accuracy, the patient was no less accurate than in the first training interval, suggesting that there was no speed-accuracy tradeoff. Importantly, following training, the patient reported dramatic improvements in face recognition in daily life. After periods without training the patient's face recognition abilities deteriorated. Fortunately, during the second training interval, the patient's everyday face recognition abilities reemerged. Neuropsychological tests administered at the end of the second training interval showed marked improvements in both the BFRT (43/54) and the Warrington tests (49/50 and 44/50, for the Words and Faces subtests, respectively).

There is evidence that the ability to identify faces from races that the user is sufficiently familiar with is greater when compared to the user's skill at identifying faces from races they are not familiar with. This effect depends on the races of faces present in the environments in which the user's perceptual abilities develop (~before age 10). As a result, in one embodiment, the methods and systems described herein can be used to help users increase their ability to identify the faces of races that they do not have perceptual expertise with. In one embodiment, a portion of the faces displayed to the user are of a racial classification that differs from a pre-trained racial classification with respect to which the user has expertise. Thus, if a user has expertise with races of a first racial classification, races of second or third racial classification may be shown to the user to enhance recognition of the same. Further, the embodiments described herein can be generally used to help users increase their overall ability to recognize faces and distinguish between individuals, whether or not the user suffers from a perception influencing condition, such as prosopagnosia.

In addition, in another embodiment of the invention, the systems and methods described above are used to implement an adaptive procedure in which the difficulty of the perceptual decision or discrimination changes based on the user's performance. For example, if users improved their accuracy, faces would be displayed for a more brief duration or would be more difficult to discriminate. Further, in another embodiment the user makes perceptual judgments on a plurality of faces which vary in the shape of facial features (eyes, nose, mouth, eyebrows), which could include changes in the size of a feature or a spatial morphing between two features.

It should be understood that the above-described embodiments and the following examples are given by way of illustration, not limitation. Various changes and modifications within the scope of the present invention will become apparent to those skilled in the art from the present description.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A method for enhancing face recognition abilities in a person having a facial recognition deficit, the method comprising the steps of:
   generating a plurality of face recognition training trials, each training trial comprising:
      generating a plurality of faces, at least one face of the plurality of faces differing from other faces in the plurality of faces in at least one aspect;
      displaying the plurality of faces to the person;
      prompting the person to discriminate each of the displayed faces in response to the at least one aspect; and
   increasing difficulty of the training trials over time as the person becomes more accurate at discriminating faces.

2. The method of claim 1 wherein the aspect by which each of the faces differs from the other faces in the plurality of faces is the distance between a mouth and a nose of the face.

3. The method of claim 1 wherein the aspect by which each of the faces differs from the other faces in the first plurality of faces is the distance between eyes and eyebrows of the face.

4. The method of claim 1 further comprising the step of repeating the steps of displaying and perceptually discriminating for a predetermined number of days.

5. The method of claim 1 further comprising the step of measuring the performance of the person in perceptually discriminating the displayed faces.

6. The method of claim 1 wherein the step of perceptually discriminating comprises categorizing each of the displayed faces in response to the at least one aspect.

7. The method of claim 1 wherein the step of perceptually discriminating comprises selecting at least one of the displayed faces in response to the at least one aspect.

8. The method of claim 1 wherein the step of perceptually discriminating comprises responding as to whether two sequentially presented faces are the same or different from each other.

9. The method of claim 1 wherein the faces are substantially lifelike computer generated images.

10. The method of claim 1 wherein a portion of the faces are of a racial classification that differs from a pre-trained racial classification with respect to which the person has expertise.

11. The method of claim 1 wherein a portion of the faces comprises faces of individuals that the person has personal knowledge.

12. The method of claim 1 further comprising periodically performing the steps of displaying and perceptually discriminating in response to personal needs.

13. The method of claim 12 wherein the steps of displaying and perceptually discriminating are performed remotely.

14. An apparatus for enhancing face recognition abilities in a person having a facial recognition deficit, the apparatus comprising:
   a system for generating a plurality of face recognition training trials, each training trial comprising a plurality of faces, at least one face of the plurality of faces differing from other faces in the plurality of faces in at least one aspect;
   a display for displaying the plurality of faces to the person; and
   a device for recording perceptual discrimination, by the person, to each of the displayed faces in response to the at least one aspect,
   wherein the difficulty of the training trials is increased over time as the person becomes more accurate at discriminating faces.

15. The apparatus of claim 14 further comprising a system for measuring the performance of the person in perceptually discriminating the displayed faces.

16. The apparatus of claim 14 further comprising a network connection to permit the person to use the display and recording portions of the system remotely.

17. The method of claim 1, wherein new faces are used for each trial.

18. The method of claim 1, wherein increasing the difficulty comprises reducing the size of relational changes to the aspects of the plurality of faces in that trial.

19. The method of claim 1, wherein increasing the difficulty comprises reducing the display time of the faces.

20. The method of claim 1, wherein increasing the difficulty is done adaptively, in response to the person's performance.

21. The method of claim 1, wherein the user has prosopagnosia and the training trials over time are effective to treat the prosopagnosia.

22. The method of claim 21, wherein the person is able to discriminate faces significantly more quickly.

23. The method of claim 22, wherein the person is able to discriminate faces significantly more accurately.

24. The method of claim 1, wherein the at least one aspect is the shape of a facial feature, the aspect including changes in the size of a feature or spatial morphing between two features.

25. A non-transitory computer readable storage medium containing instructions, that when executed, cause a processor to:
   present a plurality of face recognition training trials for enhancing face recognition abilities in a person having a facial recognition deficit, each training trial comprising:
      generating a plurality of faces, at least one face of the plurality of faces differing from other faces in the plurality of faces in at least one aspect;
      displaying each of the faces of the plurality of faces to the person; and
      prompting the person to discriminate each of the displayed faces in response to the at least one aspect; and
   increase the difficulty of the training trials over time as the person becomes more accurate at discriminating faces.

* * * * *